United States Patent [19]

Alexander

[11] 4,090,570
[45] May 23, 1978

[54] BLADED WHEEL TRACTOR

[76] Inventor: William M. Alexander, P.O. Box 128, Fargo, Ga. 31631

[21] Appl. No.: 784,277

[22] Filed: Apr. 4, 1977

Related U.S. Application Data

[63] Continuation of Ser. No. 590,694, Jun. 26, 1975, abandoned.

[51] Int. Cl.² ............................................. A01B 33/00
[52] U.S. Cl. ................................... 172/116; 280/400; 301/43; 301/44 R; 404/90; 172/554
[58] Field of Search ............... 172/547, 552, 554, 556, 172/540, 543, 52, 48, 116; 301/43, 44, 49, 51, 52; 280/400; 416/197, 244, 204, 213, 219, 220; 404/121, 124, 90

[56] References Cited

U.S. PATENT DOCUMENTS

| | | | |
|---|---|---|---|
| 1,284,385 | 11/1918 | Linden | 301/44 B X |
| 1,319,231 | 10/1919 | Lobel | 301/43 |
| 1,339,439 | 5/1920 | Downing | 301/63 R |
| 1,377,073 | 5/1921 | Hobson | 172/540 |
| 1,576,379 | 3/1926 | Turner | 301/44 B |
| 1,594,502 | 8/1926 | Elzey | 301/44 R |
| 3,435,873 | 4/1969 | Weier | 301/43 |
| 3,687,023 | 8/1972 | Moser et al. | 301/43 X |
| 3,711,121 | 1/1973 | Molby | 280/400 |
| 3,817,645 | 6/1974 | Trainor | 301/44 R X |
| 3,823,983 | 7/1974 | Peterson | 301/43 |

Primary Examiner—Paul E. Shapiro
Attorney, Agent, or Firm—Newton, Hopkins & Ormsby

[57] ABSTRACT

A bladed wheel tractor having wheels with angularly disposed blades. Each wheel has a web, radial to the periphery of which is mounted a plurality of flat plates joined to form a tubular member or rim. Each plate has a diagonally mounted blade element, the blades of the front wheels being skewed inwardly and the blades of the rear wheels being skewed outwardly.

9 Claims, 7 Drawing Figures

BLADED WHEEL TRACTOR

This is a continuation of application Ser. No. 590,694, filed June 26, 1975, now abandoned.

BACKGROUND OF THE INVENTION

1. Field of the Invention

This invention relates generally to a bladed wheel tractor and more particularly to a tractor and tractor wheel of the type which disintegrates material on the ground.

2. Description of the prior art

For many years tractors have employed wheels having blades mounted to the wheel rim at oblique angles with respect to the rim and the wheel axes. Such devices are exemplified in U.S. Pat. No. 1,341,093, 1,475,544 and 3,012,824. The initial purpose in having the blades extend obliquely of the wheel axes was to provide enhanced traction. Recently, as disclosed by U.S. Pat. No. 3,687,023, such bladed wheels have been used for the purpose of chopping previously cut farm and forestry products. For this a plurality of chopper blade wheels are preferably used with the oblique angle mountings of the blades on one wheel transverse to the oblique angle mounting of the blades on that wheel which precedes or follows it. With this arrangement a criss-cross chopping of farm and forestry products lying upon the ground terrain may be made.

Though the just described obliquely mounted bladed wheels of the prior art have functioned satisfactorily, they have been difficult and expensive to manufacture. Perhaps the foremost reason for this is attributable to the fact that rectangular blades can only be mounted axially upon a cylindrical wheel rim for complete mutual abutment between confronting surfaces to occur. Once a significantly oblique angle mounting is introduced it becomes impossible to have a planar edge of the bladed wheel abut the cylindrical wheel rim at more than a single tangential point of mutual contact. As the oblique angle increases, spacial separations between such blade and rim combination increases, rendering even the use of filling or welding material unfeasible. To overcome this, the edges of the blades to be mounted on the cylindrical rim have to be curved with the degree of curvature dependent upon the obliqueness of the angle. Formation of such a curved surface is more difficult as also is the mounting with the two surfaces in complete abutment. In addition, these prior art structural assemblies have also failed frequently from lack of rigidity or structural integrity. Furthermore, mud has also tended to accumulate extensively below the obliquely mounted blades or rim. Also, the blades themselves are difficult to sharpen.

SUMMARY OF THE INVENTION

Briefly described, the present invention includes a tractor the conventional wheels of which have been removed and bladed wheel substituted therefor. Each wheel has a rim formed of a plurality of flat rectangular juxtaposed plates, the edges of which are joined to form a tubular member. This rim is secured to a radially disposed control web which is within the rim, being spaced inwardly of the ends of the rim, the web surrounding and being removably secured to the hub of the tractor for rotation thereby.

Each plate has an outwardly protruding blade element, obliquely mounted thereon, and reinforced by axially spaced, flat, radially outwardly extending struts or ribs. One embodiment depicts a removable rectangular blade for each blade element, the blade having parallel cutting edges selectively positionable at the distal end of the blade element. Another embodiment includes an axially arcuate mud shield positionable adjacent the inner corner of each blade element.

The blade elements are skewed so as to criss-cross each other, and the blades of the front wheels being skewed inwardly and blades of the back wheels, outwardly.

Accordingly, it is an object of the present invention to provide a bladed wheel vehicle in which the blades will quite readily chop, cut and disintegrate foliage, felled tree limbs and debris, stumps and other growth, farm and forestry products on the ground and, simultaneously therewith, till the ground so as to prepare the ground for planting or replanting.

Another object of the present invention is to provide a bladed wheel tractor which will cover a wide area, when moving over the ground, and in which the wheels thereof are readily installed and removed.

Another object of the present invention is to provide a bladed wheel for a tractor, the wheel being inexpensive to manufacture, durable in structure and efficient in operation.

Another object of the present invention is to provide a bladed wheel for a tractor, the wheel being capable of providing a progressive slicing action to sever debris on the ground as the wheel rotates.

Another object of the present invention is to provide a bladed wheel for a tractor which can be quickly and easily installed and removed from a tractor and in which the blade can be readily and easily replaced and sharpened.

DETAILED DESCRIPTION

Figure 1:
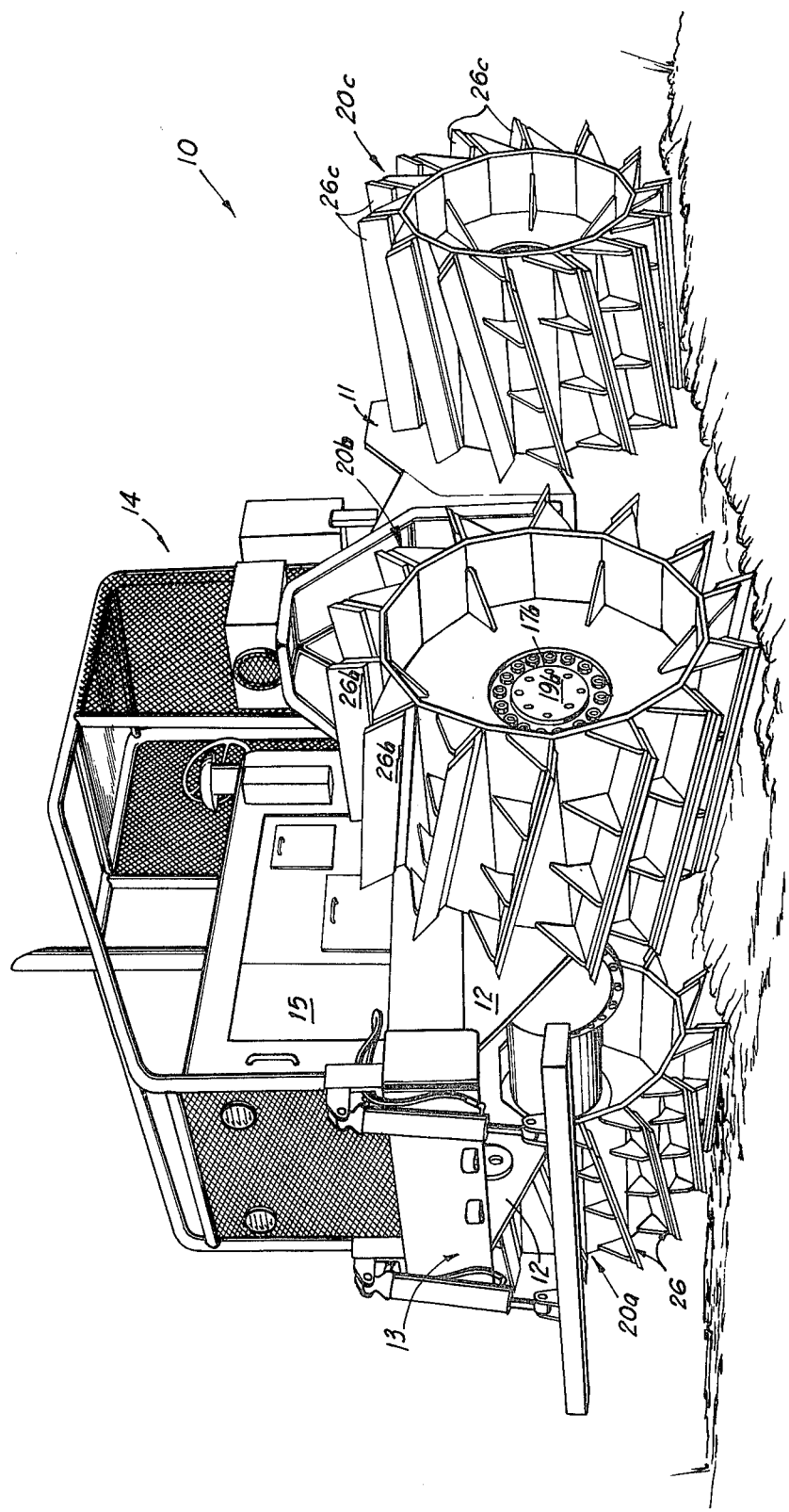
FIG. 1 is a perspective view of a tractor having a plurality of bladed wheels embodying principles of the present invention in one preferred form.

Referring now in detail to the embodiments chosen for the purpose of illustrating the present invention, numeral 10 in FIG. 1 denotes a self-propelled vehicle or tractor which is steered by relative movement of the individual wheels so that the rear portion 11 of the tractor pivots about a vertical central axis with respect to the forward portion 13 of tractor 10.

Figure 2:
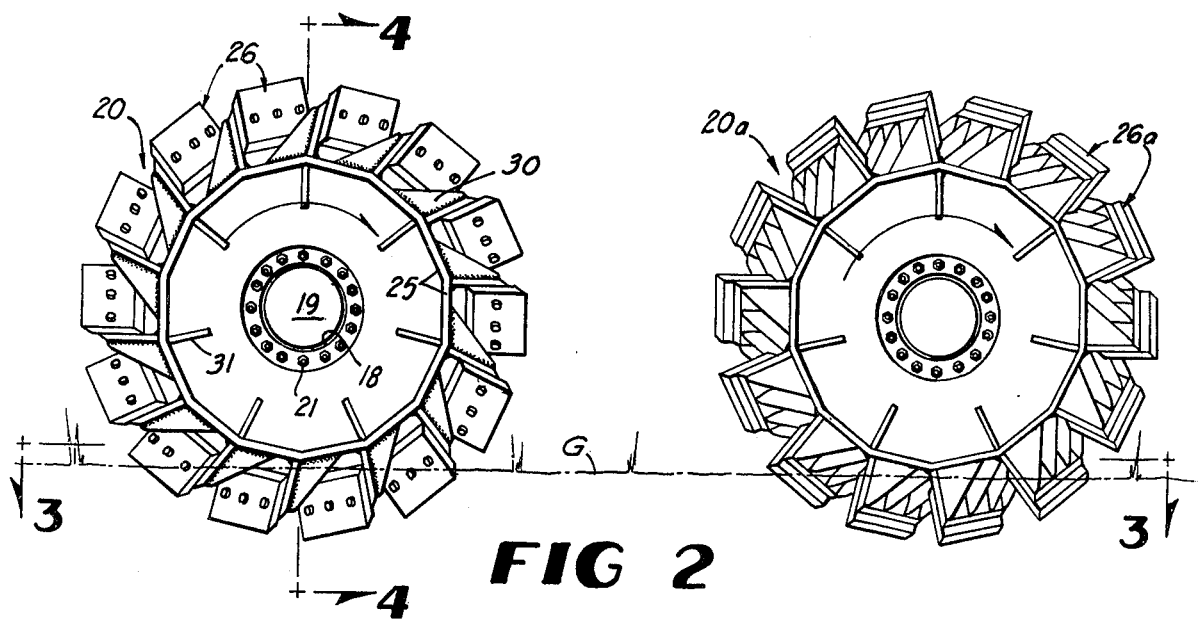
FIG. 2 is a side elevational view of the bladed wheels on the far side of the tractor of FIG. 1, the tractor, itself, being deleted from the drawing for clarity.

In the forward portion 13 is a frame 12 which supports an internal combustion engine 15, partially enclosed by the cab 14. The engine 15 drives, through hydraulic power, and through individual hydraulic motors (not shown), the aligned oppositely extending front axles, such as axle 18 seen in FIG. 2. At the outer ends of these front axles, such as axle 18, are the hubs 17, 17a which are, respectively, provided with removable inspection caps 19 and 19a. In like fashion the rear aligned oppositely extending axles, such as axle 18b seen in FIG. 2, are rotated, the axle 18b being provided with a cap 19b.

The structure thus far described is conventional.

According to the present invention, the conventional wheels (not shown) are removed from the axles, such as axles 18, 18a, 18b and these axles are respectively provided with bladed wheels, denoted generally by numerals 20, 20a, 20b and 20c. The front bladed wheels 20, 20a mounted on frame 12 are complimentary for rotation and on a common transverse axis, being respectively provided with inwardly skewed blades elements 26, 26a, to be described in more detail later. The rear bladed wheels 20b and 20c, mounted for rotation on the rear portion 11, are also complimentary, being on a second transverse axis.

Figure 3:
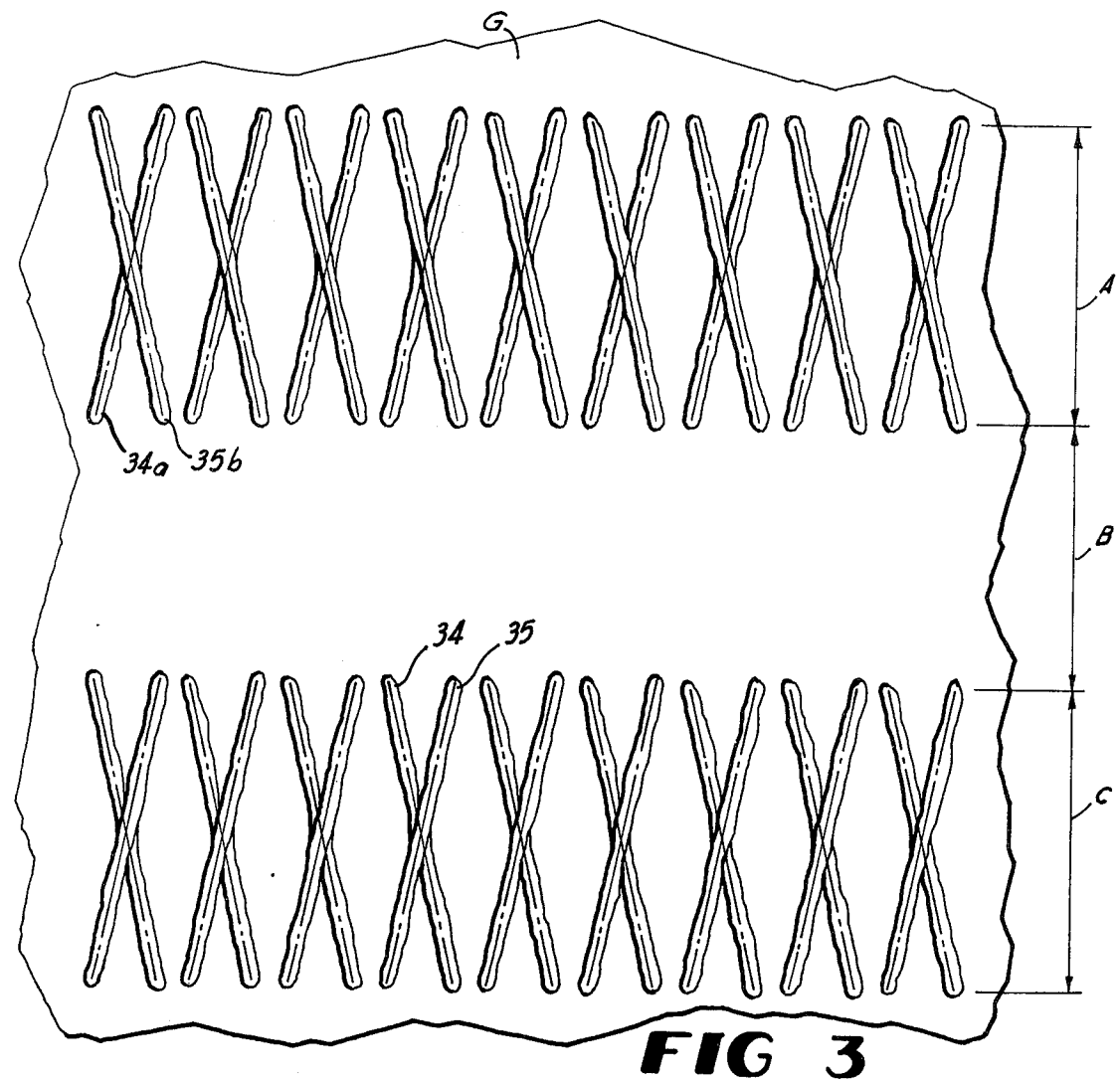
FIG. 3 is a plan view of a section of ground terrain having been transversed by the bladed wheel tractor shown in FIG. 1.

The blade elements 26b and 26c of the rear bladed wheels 20b and 20c are skewed outwardly, so that, as the blade elements 26b track the blade elements 26 to produce criss-crossed furrows 34 and 35 in the ground G such as seen in FIG. 3. In like fashion the tracking of blade elements 26a by blade elements 26c will produce the straight criss-crossed furrows 35a and 34a, respectively. Since the wheels 20, 20a, 20b, 20c are of equal transverse width, corresponding, as seen in FIG. 3, to the width A or width B of the furrows 34, 35, 34a, 35a, these furrows are also of equal width. Furthermore, the width of wheels 20, 20a, 20b, 20c should be greater than the spacing or transverse span B between such wheels so that each pass of the tractor 10 along the ground G eill score, with criss-crossed furrows (not shown) the unfurrowed ground between the inner ends of the furrows 34, 35 and 34a, 35a.

In operation, the two leading bladed wheels 20, 20a of tractor 10 form diagonal cuts 34, 34a to the ground terrain or farm products lying thereupon as shown in FIG. 3. After passage of the two leading wheels 20, 20a the rear bladed wheels 20b, 20c pass over the same area and form transverse cuts 35, 35a whereby two criss-crossed or X patterns of cuts slightly spaced apart are provided. Following this the tractor may be laterally positioned approximately the width of one wheel and a second pattern of cross cuts formed interlaced with the previous pattern. If desired, the lateral spacing between wheels may be adjusted to provide some chopping overlap. Thus, in FIG. 3 spacing B is seen to be slightly less than track widths A and C.

Figure 4:
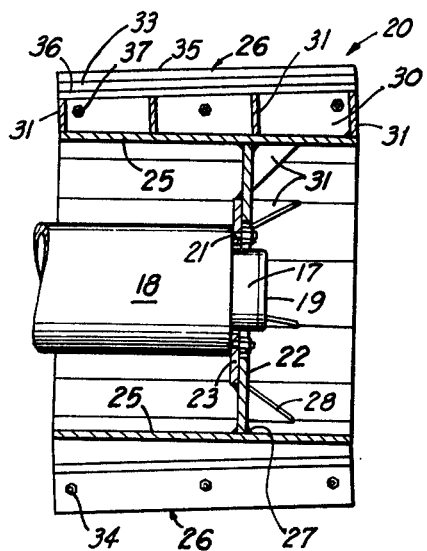
FIG. 4 is a vertical sectional view taken substantially along line 3—3 in FIG. 2.
Figure 5:
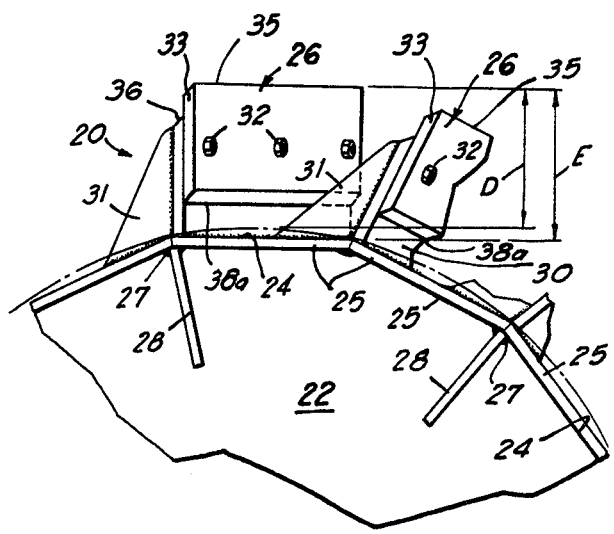
FIG. 5 is an enlarged fragmentary end elevational view of a portion of the wheel depicted in FIG. 4.

Each of the bladed wheels 20, 20a, 20b, 20c is identical, except for the inward or outward skew of their blades. Thus, suffice it to describe the construction of a single wheel 20. Referring specifically to FIGS. 4 and 5, each wheel, ie. wheel 20, includes a radially extending, wheel supporting, control web or wheel plate which includes a flat, planar, outer annular section 22 and a flat planar inner annular section 23. The inner peripheral portion of annular section 22 overlaps the outer peripheral portion of annular section 23 and is secured thereto, as by welding. The inner section 23 is provided with a plurality of circumferentially equally spaced apertures or holes, the axes of which are aligned with the threaded bores in the axle 18 and through the bolts or lugs 21 project. Thus, both the inner annular section 22 surround the hub 17, the outer annular section being provided with an inside diameter or slightly greater than the annular arrangement of bolts 21 so as to circumscribe them.

The outer periphery of outer section 22 forms a polygon consisting of 14 successive straight chords or edges 27 of equal length. These edges 27 are respectively provided with an annular succession of substantially identical flat rectangular axially extending blade carrying plates 25, the contiguous edges of which are joined so as to form a continuous, tubular, polyangular wheel rim. Thus, the rim, itself, is disposed coaxially about the axle 18, an inner portion of the rim (inwardly of the web) extending inwardly over the axle 18 and an outer portion (outwardly of the web) extending outwardly thereof.

For reinforcing the wheel on the wheel supporting web, a plurality of equally spaced triangular shaped fillets or struts 28 are provided, these fillets 28 having right angular edges abutting the surface of section 22 and abutting the common edge of the adjacent plates 25. Welds, such as welds 29 secure the fillets 28 in place.

The wheel supporting web, ie. sections 22 and 23 are inwardly of both ends of the tube or rim formed by the plates 25 so that, when installed, the tube or wheel surrounds hub 18 and also protrudes outwardly therefrom on both sides.

In the embodiment of FIGS. 4 and 5, each blade element 26 is formed by a rectangular, diagonally extending blade supporting plate 30, the inner or proximal edge of which is secured, by welding for example, diagonally across each rim plate 25, the plate 30 protrudes in a radial direction, outwardly therefrom. Triangular reinforcing ribs or struts 31 equally spaced from each other, have surfaces abutting the outer surface of rim plate 25 and back surface of blade supporting plate 30. Each rib 31 is disposed in a radial plane parallel to its adjacent rib 31.

Each blade supporting plate 30 is provided with a plurality of transversely aligned, equally spaced, holes in the central portion of plate 30. Bolts 32 which extend through holes in a rectangular blade 33 and through the holes in plate 30 are removably secured in place by nuts 37.

The rectangular blade 33 is a flat member having, along its long sides, straight, parallel bevelled cutting edges 38 and 38a, respectively. The edges 38, 38a are bevelled toward opposite surfaces so that the bevelled surfaces are parallel. The centerline of the holes in blade 33 is midway between and parallel to edges 38, 38a so that, when one edge, such as edge 38 is worn, the blade 33 may be rotated 180° so that edge 38a is disposed outwardly. This can be accomplished by removing bolts 32 and reinstalling them when the holes in blade 33 and plate 30 are appropriately realigned.

When installed, the blades 33 are equally spaced circumferentially around the axis of wheel 20, however since each rim plate 25 of the polyangular rim is flat and along a chord of the circumference of wheel 20, and the blade 33 is angularly disposed to the axis of wheel 20 with its cutting edge 38 parallel to the surface of plate 25, the leading corner of a blade edge 38 will initially engage the ground and then, progressively, this edge 38 will engage the ground G from leading corner to trailing corner of blade edge 38. Each blade edge 38 is spaced a distance D from the periphery of the drum or rim of wheel 20 and a distance E (which is greater than distance D) from the outer surface of its associated rim plate 25.

The outer or distal edge 36 of plate 30 is parallel to plate 25 and bevelled toward the blade 33, as seen in FIG. 5. Furthermore, the width of blade 33 is sufficient that it protrudes outwardly beyond bevelled edge 36 when the blade 33 is received in flat overlapping relationship against plate 30.

Also, when blade 33 is installed on plate 30, its inner or proximal edge 38a is spaced outwardly of rim plate 25. The bevel of blade edge 38a is forwardly so that no appreciable crevice is left for collecting mud or dirt.

Figure 6:
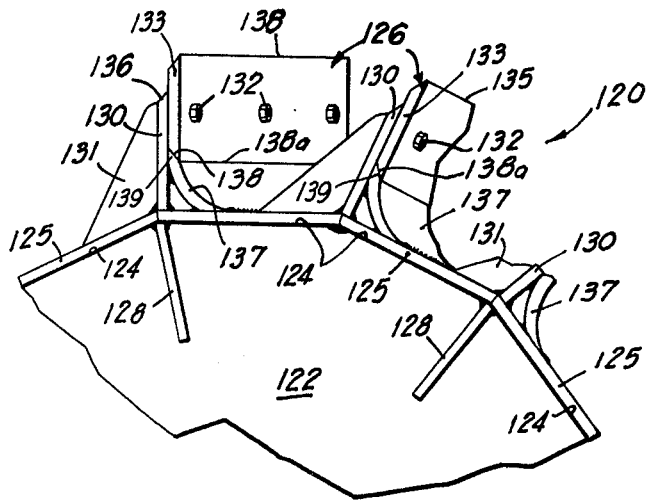
FIG. 6 is a view similar to FIG. 5 but showing a modified form of the bladed wheel of the present invention.

In the second embodiment, depicted in FIG. 6, a bladed wheel 120 is depicted, having an annular section 122, chord edges 124, rim plates 125, fillets 128, blade supporting plates 130, edge 136, ribs 131 and bolts 132 all identical to the corresponding elements of the preceding embodiments. In this embodiment, however, each flat, rectangular, blade 133 of blade element 126 has the parallel bevelled cutting edge 138 and cutting edge 138a, bevelled toward the front surface of blade 133.

Furthermore, at the junction of rim plate 125 and blade supporting plate 130, a rounded, transversely curved, dirt shield 137, concaved about an axis parallel to plate 130, is provided, this shield 137 being secured to the rim plate 125 and to an intermediate protion of the front surface of plate 130. This shield is secured to the rim plate 125 next adjacent the individual rim plate 125 of the particular carrying plate 130 which it served, as the carrying plate 130 approaches its diagonal extremity.

The outer edge 139 of shield 137 is bevelled to conform to the bevel 138 or 138a which is disposed against this edge 139, when the blade 133 is in place, as shown in FIG. 6.

Figure 7:
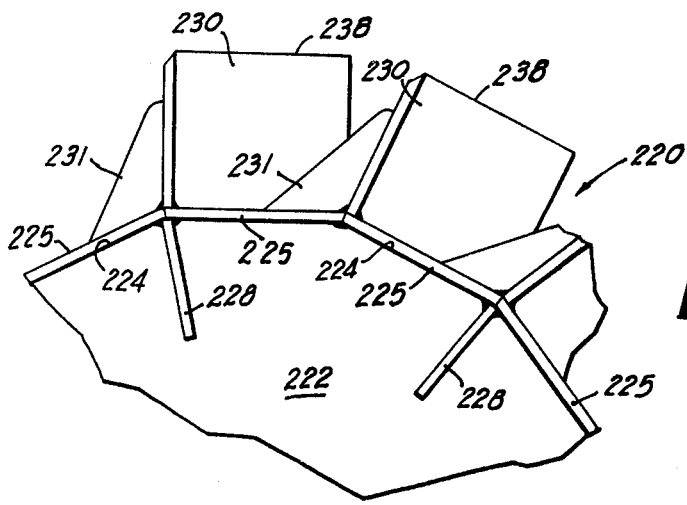
FIG. 7 is a view similar to FIGS. 5 and 6 showing another modified form of bladed wheel of the present invention.

In the embodiment of FIG. 7, a simplified structure is depicted which includes a bladed wheel 220 having, an annular section 222, chord edges 224, rim plates 225, fillets 228 and ribs 231, all identical to the preceding embodiment. The rectangular element 230, however, functions as a blade, itself, in that the distal or outer edge is bevelled to form a straight cutting edge 238, parallel to plate 225.

We thus see that an improved bladed wheel 20, 120 or 220 is provided for a self propelled vehicle such as a tractor 10. The improved bladed wheels 20, 20a, 20b, 20c have enhanced structural rigidity over those of the prior art and are relatively simple and economical to manufacture. In part this is achieved by the providing of a polyangular rim, formed of flat rectangular juxtaposed plates 25, 125, 225, blade elements 26, 126, 226 being obliquely mounted, the blades 33, 133 and 226 thereof having straight cutting edges 38, 138, 238 thereby negating the need for forming arcuate edges on the chopper blades or to the blade mountings. In FIG. 5 the difference between distances D and E thus denotes maximum spacing that would have occurred between portions of the blade element 20 and rim had it been cylindrical in conventional fashion. Mud inhibiting means or shields 137 not only inhibit the accumulation of mud upon the wheel but further enhance the structual rigidity of the assembly.

In FIG. 1, it will be seen that since the axes of the wheels 20, 20a are in transverse alignment their rims are also in transverse alignment. The same is true of the wheels 20b and 20c.

As each of the wheels 20, 120, 220 pass over the ground G, the leading tip or corner of the cutting edge 38, 138 or 238 engages the ground first and then, the edge 38, 138 or 238 progressively engages the ground G, in a slicing action whereby the trailing tip or corner is the last to leave the ground.

The essentially perpendicular or right angular disposition of the plate 25, 125 or 225 with respect to its rim plate 25, 125 or 225 and its diagonal or angular disposition along the plate 25, 125 or 225, provides a very rugged construction which is further reinforced by the ribs 30, 130 or 230. Thus, the wheels 20, 20a, 20b, 20c, 120 and 220 will withstand quite extensive use under adverse conditions.

The blade edges 38, 38a, 138, 138a, 238, being straight, are quite easily sharpened periodically. By removing only a few bolts 32, 132, the blades 33 and 133 can be removed for sharpening or rotated to present at the distal end of the element 20 or 120, the blade edge 38a for blade edge 38 or blade edge 138a for blade edge 138.

By removing only bolts or lugs 21, a wheel, such as wheel 20 can be replaced in the field.

It should be understood that the just described embodiments merely illustrate principles of the invention in preferred forms. Many modifications, deletions or additions may, of course, be made thereto without departure from the spirit and scope of the invention as set forth in the following claims.

What is claimed is:

1. An improved bladed wheel for a tractor comprising a web having a polyangular periphery; a polyangular rim comprising an annular succession of substantially rectangular rim plates flat throughout their respective outer surfaces mounted about said polyangular web periphery; and blade elements with straight inner edges mounted respectively obliquely to said substantially rectangular flat plates, said straight inner edges being secured to said flat plates throughout substantially the entire lengths of said inner edges, each of said blade elements being mounted substantially diagonally to each of said substantially rectangular flat plates.

2. An improved bladed wheel in accordance with claim 1 further comprising a plurality of axially spaced radially extending ribs mounted to each of said blade elements and to said polyangular rim.

3. An improved bladed wheel in accordance with claim 2 wherein said blade elements extend obliquely across said flat plates from one end to another; one portion of each of said ribs is in engagement with one of said flat plates; and another portion of each of said ribs is in engagement with one of said blade elements intermediate said one end and said other end thereof.

4. An improved bladed wheel in accordance with claim 1 wherein each of said blade elements includes a flat blade supporting plate mounted by one edge defining each of said straight inner edges and mounted thereby to said rim and a flat blade mounted in overlapping relationship to said supporting plate and in spaced relationship with said rim, said blade protruding outwardly beyond the outer edge of said supporting plate.

5. An improved blade wheel in accordance with claim 4 wherein each of said flat blades has parallel cutting edges, said cutting edges being bevelled whereby the bevelled edges may be reversibly disposed at the distal end of said blade from said flat blade supporting plate.

6. An improved bladed wheel in accordance with claim 1 further comprising a plurality of triangular fillets mounted to said web and to said polyangular rim.

7. An improved bladed wheel for a tractor comprising a web having a polyangular periphery; a polyangular rim comprising an annular succession of substantially rectangular flat rim plates mounted about said polyangular web periphery; and blade elements mounted respectively obliquely diagonally to each of said substantially rectangular flat plates, each of said blade elements including a flat blade supporting plate mounted by one edge to said rim and a flat blade mounting in overlapping relationship to said supporting plate and in spaced relationship with said rim, said blade protruding outwardly beyond the outer edge of said supporting plate, and a plurality of arcuate mud shields mounted to said rim, each of said shield having a portion adjacent one end thereof in engagement with said supporting plate and having another portion adjacent the other end thereof in engagement with said blade element.

8. A bladed wheel tractor comprising:
  (a) a tractor having oppositely extending axles;
  (b) bladed wheels respectively on said axles; said bladed wheel each including a radially extending web member received for rotation on its associated axle, a polyangular tubular rim and including a series of rim flat plates joined by their edges about the exterior of said rim, said rim being secured to the periphery of said web member intermediate the ends of said rim, said rim being concentric with said axle, the portion of said rim protruding outwardly of said axle, said bladed wheel including blade elements respectively carried by and protruding outwardly of said rim plates; and
  (c) means for removably securing said web to said axle; said tractor having a front protion and a rear portion pivotally connected to each other about a vertical axis, said front portion having a pair of the oppositely extending axles forming front axles, said rear portion having a pair of the oppositely extending axles forming rear axles, and an engine, each of said axles being individually driven by said engine; said bladed wheel also includes a blade on each of said blade elements disposed obliquely of the axis of said rim and wherein a pair of said bladed wheels are disposed on said front axles, with their rims in transverse alignment with each other and a pair of said bladed wheels are disposed on the rear axles with their rims in transverse alignment with each other.

9. The bladed wheel tractor defined in claim 8 wherein said bladed wheels on said front axles have their blade elements skewed inwardly and said bladed wheels on said rear axles have blades skewed outwardly.

* * * * *